(12) United States Patent
Castell et al.

(10) Patent No.: US 6,870,733 B2
(45) Date of Patent: Mar. 22, 2005

(54) STANDARDIZED RF MODULE INSERT FOR A PORTABLE ELECTRONIC PROCESSING DEVICE

(75) Inventors: Robin T. Castell, Spring, TX (US); William Caldwell Crosswy, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/735,326

(22) Filed: Dec. 12, 2003

(65) Prior Publication Data

US 2004/0125553 A1 Jul. 1, 2004

Related U.S. Application Data

(63) Continuation of application No. 09/675,619, filed on Sep. 29, 2000, now Pat. No. 6,717,801.

(51) Int. Cl.[7] .............................. G06F 1/16; H01Q 1/38
(52) U.S. Cl. .................... 361/683; 361/753; 455/575.7; 455/556.1; 439/638; 343/720
(58) Field of Search .......................... 455/556.1, 575.7, 455/556–558, 90; 361/683, 686, 736, 737, 725, 752, 753; 439/638, 26.1, 945, 946, 74, 131; 343/720, 702, 797, 729

(56) References Cited

U.S. PATENT DOCUMENTS

| | | |
|---|---|---|
| 4,788,550 A | 11/1988 | Chadima, Jr. |
| 5,440,449 A | 8/1995 | Scheer |
| 5,566,226 A | 10/1996 | Mizoguchi et al. |
| 5,583,521 A | 12/1996 | Williams |
| 5,644,320 A | 7/1997 | Rossi |

(List continued on next page.)

OTHER PUBLICATIONS

"High–Impedance Electromagnetic Surfaces with a Forbidden Frequency Band," D. Sieenpiper et al., IEEE Transactions on Microwave Theory and Techniques, vol. 47, No. 11, Nov. 1999, 18 pp. (previosuly cited in parent case U.S. Appl. No. 09/675,619).

"Low–Profile Enhanced–Bandwidth PIFA Antennas for Wireless Communications Packaging," K.L. Virga et al., IEEE Transactions on Microwave Theory and Techniques, vol. 45, No. 10, Oct. 1997, 10 pp. (previously cited in parent case U.S. Appl. No. 09/675, 619).

Primary Examiner—Lisa Lea-Edmonds

(57) ABSTRACT

A wireless network adapter for establishing wireless communication links between electronic devices. In one embodiment, the wireless network adapter comprises wireless communication circuitry encased in a shell in the form of a detachable molding element of an electronic device. The wireless network adapter further comprises a bus connector adapted to couple the wireless communication circuitry to an expansion bus when the shell is attached to an outer surface of an electronic device. The wireless network adapter is a fully integrated solution further comprising an RF antenna for communication with a wireless network and a radio modem comprising a radio, a receiver, and modulation circuitry. The RF antenna in the wireless network adapter may take one of several forms. The antenna may be a dedicated unit housed within the shell of the wireless network adapter. Alternatively, the antenna may form a part of the outer shell of the adapter or it may form a part of a company logo located on the shell the adapter. The wireless network adapter is installed in an electronic device such as a portable computer. The electronic device comprises, at a minimum, a system microprocessor, an expansion bus, a read-writeable memory device, an input/output device, and an expansion port connected to the expansion bus that is configured to accept the detachable wireless network adapter. Another embodiment of the present invention comprises an electronic device equipped with an external sleeve configured to accept a wireless network adapter insert.

15 Claims, 13 Drawing Sheets

U.S. PATENT DOCUMENTS

| | | | | |
|---|---|---|---|---|
| 5,661,635 A | * | 8/1997 | Huffman et al. | 361/683 |
| 5,680,144 A | * | 10/1997 | Sanad | 343/702 |
| 5,764,693 A | | 6/1998 | Taylor et al. | |
| 5,768,163 A | | 6/1998 | Smith, II | |
| 5,809,115 A | | 9/1998 | Inkinen | |
| 5,867,131 A | * | 2/1999 | Camp et al. | 343/702 |
| 5,903,548 A | | 5/1999 | Delamater | |
| 5,913,174 A | | 6/1999 | Casarez et al. | |
| 5,918,183 A | | 6/1999 | Janky et al. | |
| 5,987,547 A | | 11/1999 | Panasid et al. | |
| 6,005,700 A | | 12/1999 | Pressler et al. | |
| 6,049,450 A | * | 4/2000 | Cho et al. | 361/683 |
| 6,131,136 A | | 10/2000 | Liebenow et al. | |
| 6,164,989 A | | 12/2000 | Glad | |
| 6,172,645 B1 | | 1/2001 | Hollander et al. | |
| 6,230,214 B1 | | 5/2001 | Liukkonen et al. | |
| 6,243,589 B1 | | 6/2001 | Novel | |
| 6,266,241 B1 | | 7/2001 | Van Brocklin et al. | |
| 6,327,154 B1 | | 12/2001 | Gauld et al. | |
| 6,341,069 B1 | | 1/2002 | Torlotin | |
| 6,433,818 B1 | | 8/2002 | Steinberg et al. | |
| 6,483,814 B1 | | 11/2002 | Hsu et al. | |

* cited by examiner

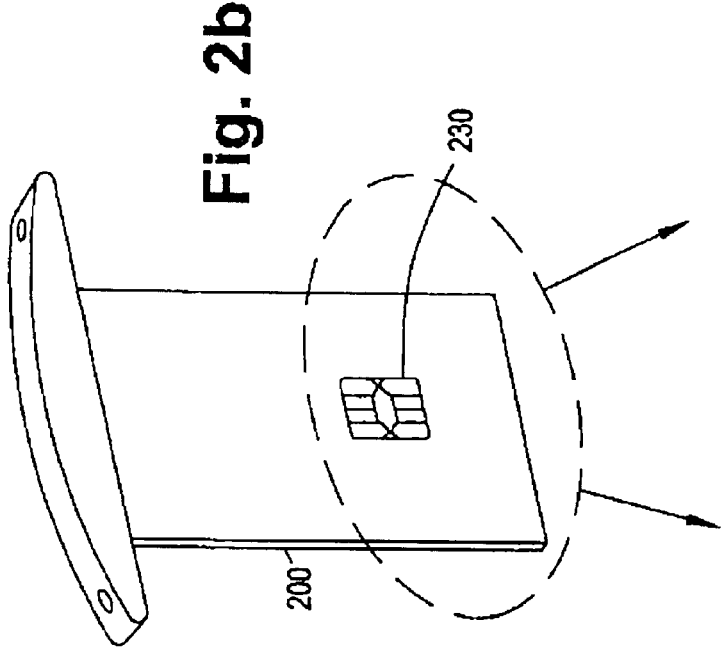
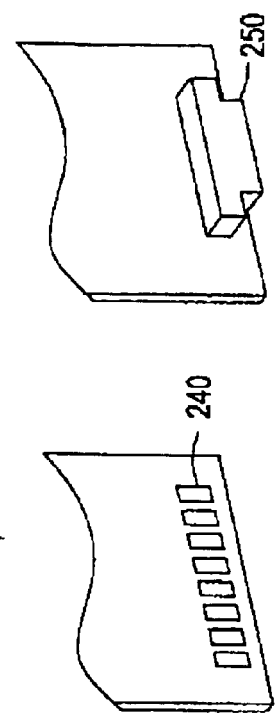
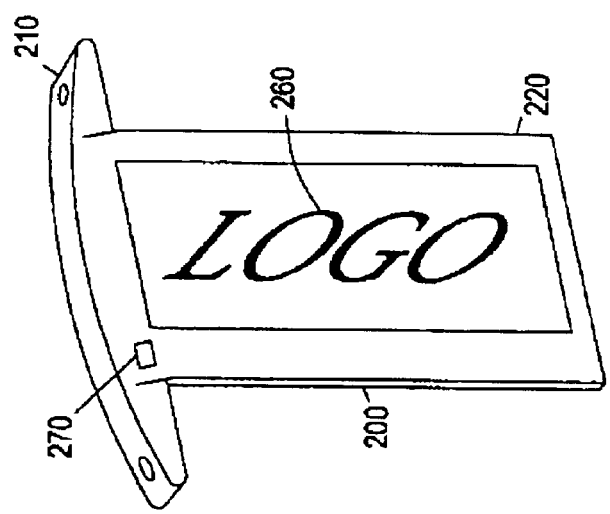

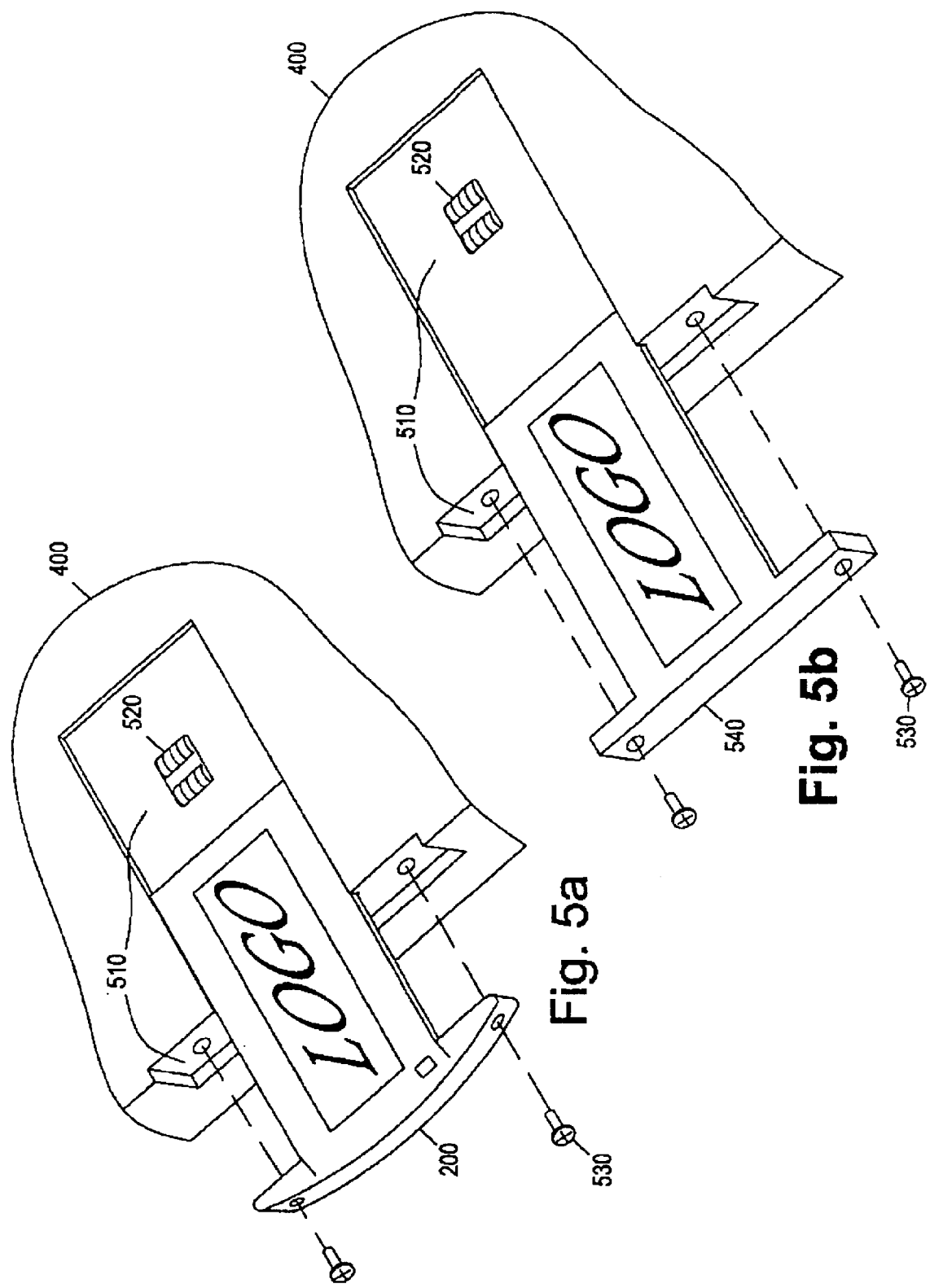

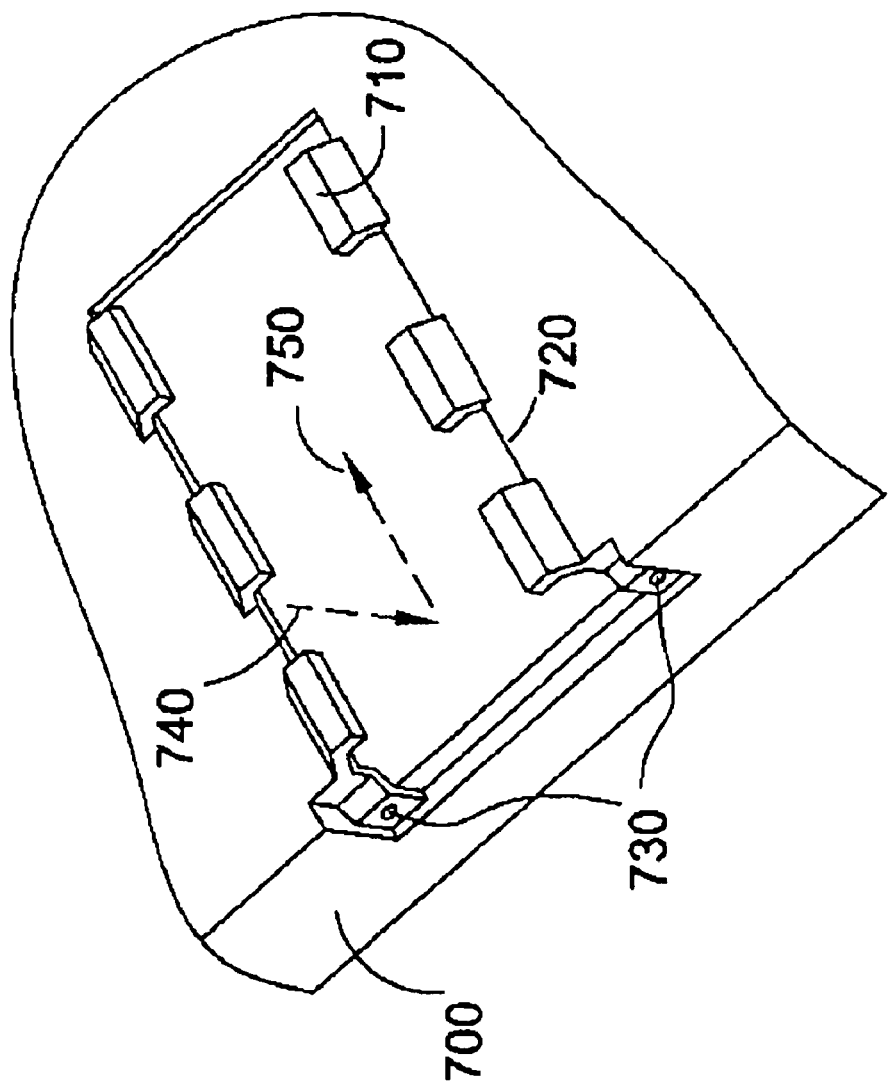

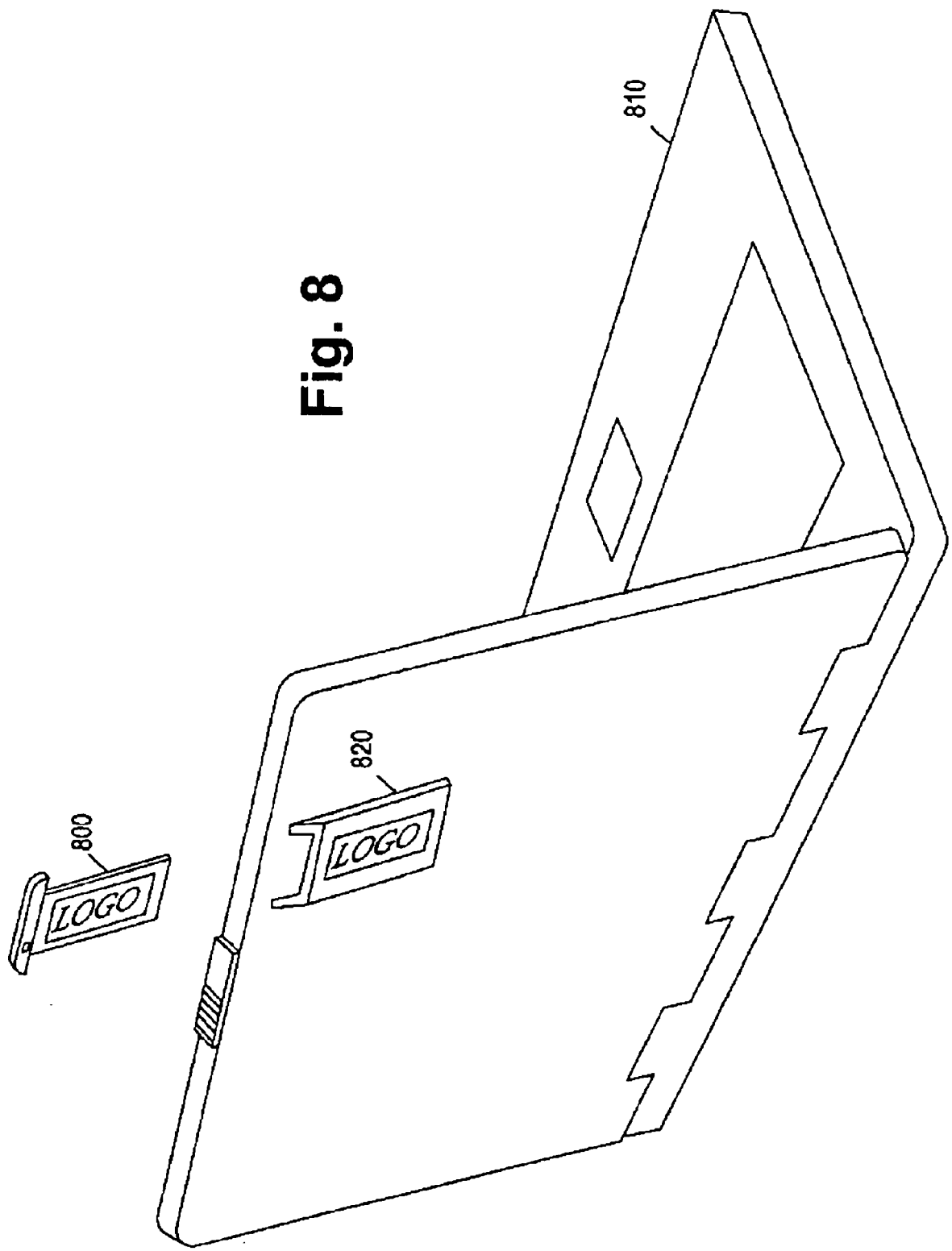

STANDARDIZED RF MODULE INSERT FOR A PORTABLE ELECTRONIC PROCESSING DEVICE

CROSS-REFERENCE TO RELATED APPLICATIONS

This application is a continuation of U.S. patent application Ser. No. 09/675,619, filed on Sep. 29, 2000 now U.S. Pat. No. 6,717,801, which is hereby incorporate by reference herein.

STATEMENT REGARDING FEDERALLY SPONSORED RESEARCH OR DEVELOPMENT

Not applicable.

BACKGROUND OF THE INVENTION

1. Field of the Invention

The present invention relates generally to a technique for incorporating an RF transceiver onto the body of an electronic device. More particularly, it relates to a fully integrated, device-independent RF transmit/receive module that combines the antenna and associated electronics into a single package and can be installed and used on a variety of electronic devices for the purpose of communicating with other electronic devices.

2. Background of the Invention

As portable devices become more capable of storing and displaying information, a need inherently arises for data transfers between these devices. One example of this type of transfer includes the downloading of personal schedules and contact information from a computer to a personal digital (or data) assistant (PDA). This communication link is typically established via cumbersome cabling and often proprietary connectors. Wireless communication networks allow this type of data transfer to take place without the need for physical connections.

Generally stated, wireless communication allows for the transmission and reception of data without the need for physical connections. This data can take many forms including audio and video signals or even facsimile and text messages. The progress of wireless telephony and wireless communication between people has been aided by the development of cellular standards such as GSM in Europe and AMPS, CDMA, and TDMA in North America. With the development of standards such as Bluetooth and IEEE 802.11, wireless communication between electronic devices is becoming even more prevalent.

The Bluetooth and IEEE 802.11 wireless communication standards allow for short range radio links between electronic devices. In general, these standards allow for point-to-point or point-to-multipoint wireless communications. The Bluetooth standard is generally used in wireless personal area networks (WPAN) and allows users to transfer information between mobile PCs, mobile phones and other devices. The IEEE 802.11 standard is generally used for wireless local area networks (WLAN) and may be used to communicate between PCs, PDAs, and other computing devices. Both offer the advantage of allowing a user or users to establish communications between two or more electronic devices for a data transfer without the need for cumbersome cabling and connectors. Radios which operate according to these standards may transmit or receive signals in the unlicensed, universal ISM (Industrial, Scientific, and Medical) radio frequency band between 2.4 and 2.4835 GHz.

The IEEE 802.11 standard and the IrDA standards also allow for wireless communication via infrared (IR) transmission in the 300 to 428,000 GHz range. IR communication may offer greater security than RF communication, but also requires a direct "line of sight" link between the communicating devices and can be adversely affected by environmental influences. RF transmission, on the other hand, allows for communication around corners and through walls or barriers. Security and interference problems associated with RF communications are alleviated with the implementation of direct sequence or frequency hopping spread spectrum techniques. Other measures such as error correction and collision avoidance help ensure robust data transfers.

Current wireless point to point communication solutions exist in either a device model-dependent proprietary solution designed into the main body of a product or may take the form of a PCMCIA card for use with notebook computers. PCMCIA (Personal Computer Memory Card International Association) is an international standards body and trade association that was founded to establish standards for Integrated Circuit cards and to promote interchangeability among mobile computers. PCMCIA cards (also referred to as PC Cards) and slots provide a means of adding external peripheral components such as a modem or a Network Interface Card to a notebook computer. Companies such as Motorola and Samsung are currently offering PC Card solutions for Bluetooth WPANs and/or IEEE 802.11 WLANs.

Other point to point wireless communication solutions may take the form of Mini PCI cards that are integrated inside a notebook computer. Mini PCI cards are miniature form factor versions of the PCI (Peripheral Component Interconnect) expansion cards used in desktop computers. PCI and Mini PCI cards plug into a high-speed input/output PCI bus used for connecting performance-critical peripherals to the memory, chipset, and processor. For example, video cards, disk storage devices, and high-speed network interfaces generally use a bus of this sort.

Wireless communication devices that take the form of Mini PCI or PC cards are convenient in that they are based on existing computer hardware and bus architecture. Unfortunately, these solutions also occupy existing expansion slots that could otherwise be used for peripherals such as network cards and video drivers. Furthermore, any solution that places the RF antenna in close proximity to a computer's motherboard and microprocessor is less than ideal. The computer processor and chipset generate noise which results in signal degradation and attenuation. Attenuation is also a result of RF signal multipathing that results from placing the RF antenna in a position where signals can be obstructed by the notebook computer screen and other parts of the system such as magnesium cases or EMI-shielded plastic components.

Experiments show that for significant improvements in performance, the RF antenna in a wireless communication device should be placed high up in an unobstructed location. To account for this, other conventional wireless point to point communication solutions employ a whip or blade type antenna that is mounted high on the device itself or located external to the device. In devices where the antenna is mounted directly to the communicating device, the antenna usually extends beyond the envelope of the product in which they are installed and may be prone to damage resulting in expensive replacement costs. Examples of these types of antennas are described in U.S. Pat. Nos. 5,644,320 and 5,903,548.

Furthermore, in some conventional designs the radio circuitry is often located separate from the antenna. In cases like this, the antenna must be connected via a coaxial cable or shielded wire assembly to the main radio circuitry, which adds to the cost and introduces signal loss and degradation. In addition to being unsightly, the cable assembly can be a nuisance and become tangled with other wiring or other equipment or suffer damage if routed through moving components such as notebook lid hinges. Furthermore, as product configurations change and locations of the radio components change, each new radio configuration must be re-qualified for use by the FCC.

Another disadvantage of certain existing designs is that as wireless specifications change, radio circuitry may become obsolete. If the radio circuitry and/or the antenna subsystem is hardwired into the parent device, then significant disassembly, component replacement, and downtime are required to bring the communication device up to date.

It is desirable, therefore, to provide a small, low cost, fully integrated radio module that can be assembled as a complete unit that is standardized across product lines. This radio module would preferably be fully contained (i.e., include antenna and all related circuitry) so that no cable or connector losses occur and would be easily installed in a parent device such as a portable computer or a PDA. Furthermore, the configuration of the module would allow for optimal placement with regards to RF signal reception and transmission.

BRIEF SUMMARY OF THE INVENTION

The problems noted above are solved in large part by a fully integrated wireless communication device as disclosed herein. In one embodiment, a wireless network adapter comprises wireless communication circuitry encased in a shell in the form of a detachable molding element of an electronic device. The wireless network adapter also comprises a bus connector to couple the wireless communication circuitry to an expansion bus when the shell is attached to an outer surface of the electronic device. The adapter is a fully integrated module comprising an RF antenna for communication with a wireless network and a radio modem comprising a radio, a receiver, and modulation circuitry. The RF antenna in the wireless network adapter may take the form of a dedicated unit housed within the shell of the wireless network adapter, or alternatively, may form a part of the outer shell of the adapter. In yet another solution, the RF antenna may form a part of a company logo located on the shell the adapter.

An alternative embodiment may comprise a detachable molding element that encases a recess in a computer system and a circuit card assembly assembled in the recess of the computer system. The circuit card assembly preferably comprises a fully integrated RF radio module comprising an RF antenna for communication with a wireless network and radio circuitry including a radio, a receiver, and modulation circuitry.

The present invention also contemplates a portable computer comprising, at a minimum, a system microprocessor, an expansion bus, a read-writeable memory device, an input/output device, and an expansion port connected to the expansion bus that is configured to accept the detachable wireless network adapter. Another embodiment of the present invention may comprise a portable computer equipped with an external sleeve configured to accept a wireless network adapter insert.

The wireless network adapter, as disclosed herein, may advantageously provide a compact, inexpensive solution for enabling wireless communications between electronic devices. The adapter is standardized for assembly as a complete unit across product lines and the configuration of the adapter allows for optimal placement with regards to RF signal reception and transmission.

BRIEF DESCRIPTION OF THE DRAWINGS

For a detailed description of the preferred embodiments of the invention, reference will now be made to the accompanying drawings in which:

FIG. 2a shows an isometric view of a preferred embodiment of a fully integrated RF transceiver radio;

FIG. 2b is a reverse isometric view showing the SIM-style connector of the preferred embodiment shown in FIG. 2a;

FIGS. 2c and 2d show alternative embodiments of the RF transceiver radio which implement different connector styles;

FIG. 5a shows a preferred embodiment of the installation of an RF transceiver radio in a notebook computer;

FIG. 5b shows a preferred embodiment of the installation of a passive insert in place of an RF transceiver radio in a notebook computer;

FIG. 7 shows a third receptacle embodiment for an RF transceiver module;

FIG. 8 shows an isometric view of fourth embodiment of an RF transceiver radio installation socket;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to. . . . " Also, the term "couple" or "couples" is intended to mean either an indirect or direct electrical connection. Thus, if a first device couples to a second device, that connection may be through a direct electrical connection, or through an indirect electrical connection via other devices and connections. Additionally, the figures described above depict embodiments of the present invention as they might exist for a laptop computer configuration. This document and the claims herein do not intend to limit the scope of the invention to include only laptop computers, but rather the present invention may appropriately be applied to any of a variety of electronic devices including, but not limited to, notebook or palmtop computers, cellular or wireless telephones, printers, PDAs, calculators, desktop computers, facsimile machines, keyboards, joysticks, headsets, scanners, and other electronic devices.

DETAILED DESCRIPTION OF THE PREFERRED EMBODIMENTS

Figure 1:
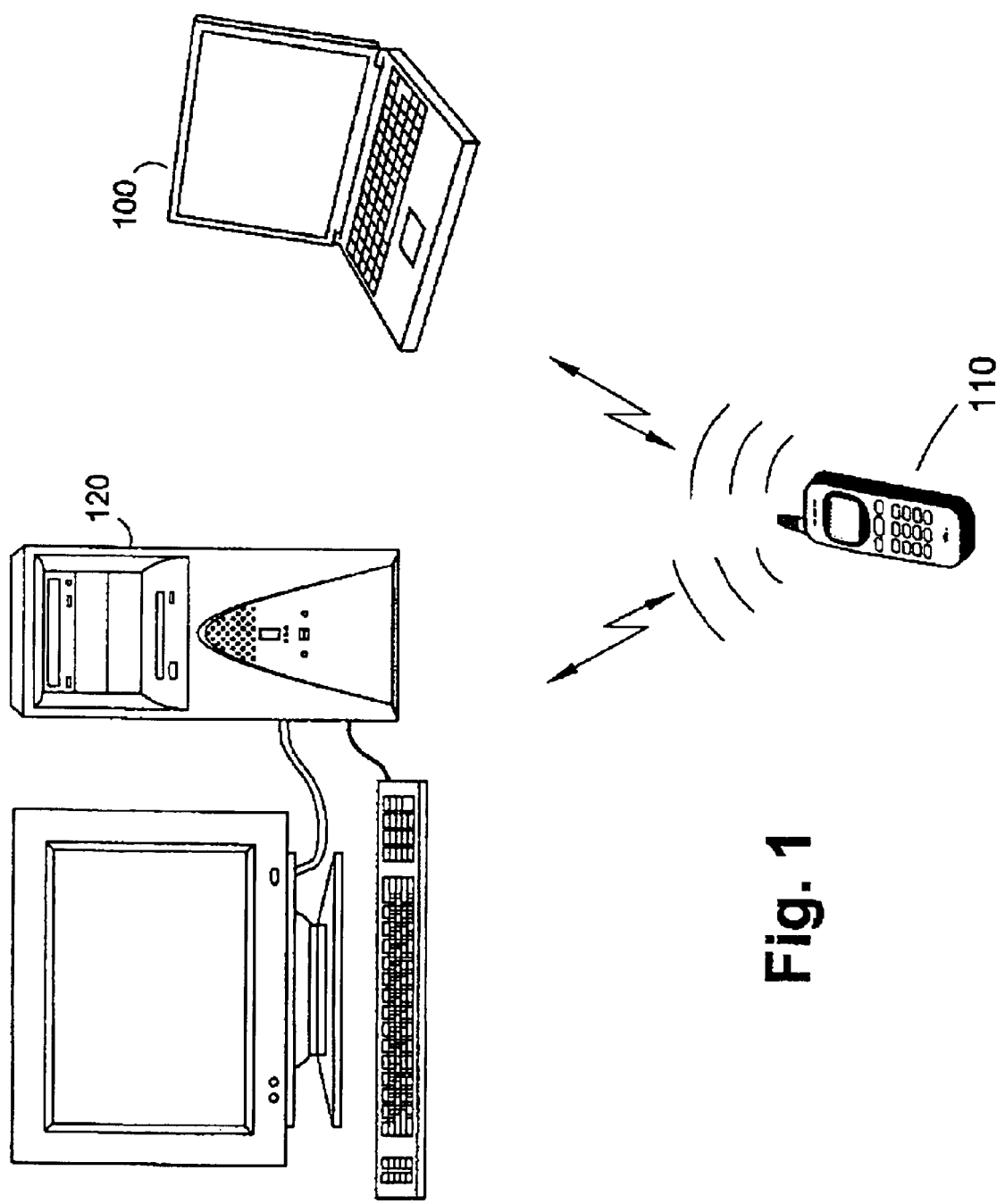
FIG. 1 shows an illustrative diagram of a simple wireless personal area network.

FIG. 1 shows an example of a wireless computer network representing a preferred embodiment of the invention, in which a portable computer 100, a cellular phone 110 and a desktop computer 120 may communicate and/or transfer data to one another via wireless communication links. The communication network may be a Bluetooth personal area network, a "HomeRF" network, a wireless local area network per IEEE 802.11 or any other suitable wireless network. It should be appreciated that a variety of devices may reside and communicate in the network in addition to the devices shown in FIG. 1. These other devices may include facsimile machines, keyboards, joysticks, headsets and any other electronic device whose operation may benefit from a wireless network.

In order to communicate with other devices, each unit must incorporate an RF (and/or an IR) transceiver that is capable of transmitting and receiving signals per the appropriate communication standard. Naturally, each device in the network must be fitted with compatible radios in order to communicate with the other network devices.

A preferred embodiment of a fully integrated wireless link adapter 200 is shown in FIG. 2a. The embodiment shown in FIG. 2a integrates a housing for the wireless transceiver 220 and a housing for the wireless transducer 210 into one package. An LED (light emitting diode) 270 may be provided to indicate to the user when the wireless adapter 200 is operating. A company logo 260 may be incorporated for aesthetic reasons, or may be incorporated to implement a functional transducer as described below. The inclusion of the logo may advantageously allow the wireless link adapter 200 to double as a marketing or brand-identifying insert to establish the identity of the manufacturer or owner of the electronic device to which it is attached.

In the following description, it will be assumed that adapter 200 operates to establish an RF radio communications link. However it is noted that adapter 200 may alternatively operate to establish an IR communications link or some other form of wireless communications (e.g., ultrasonic).

Figure 3:
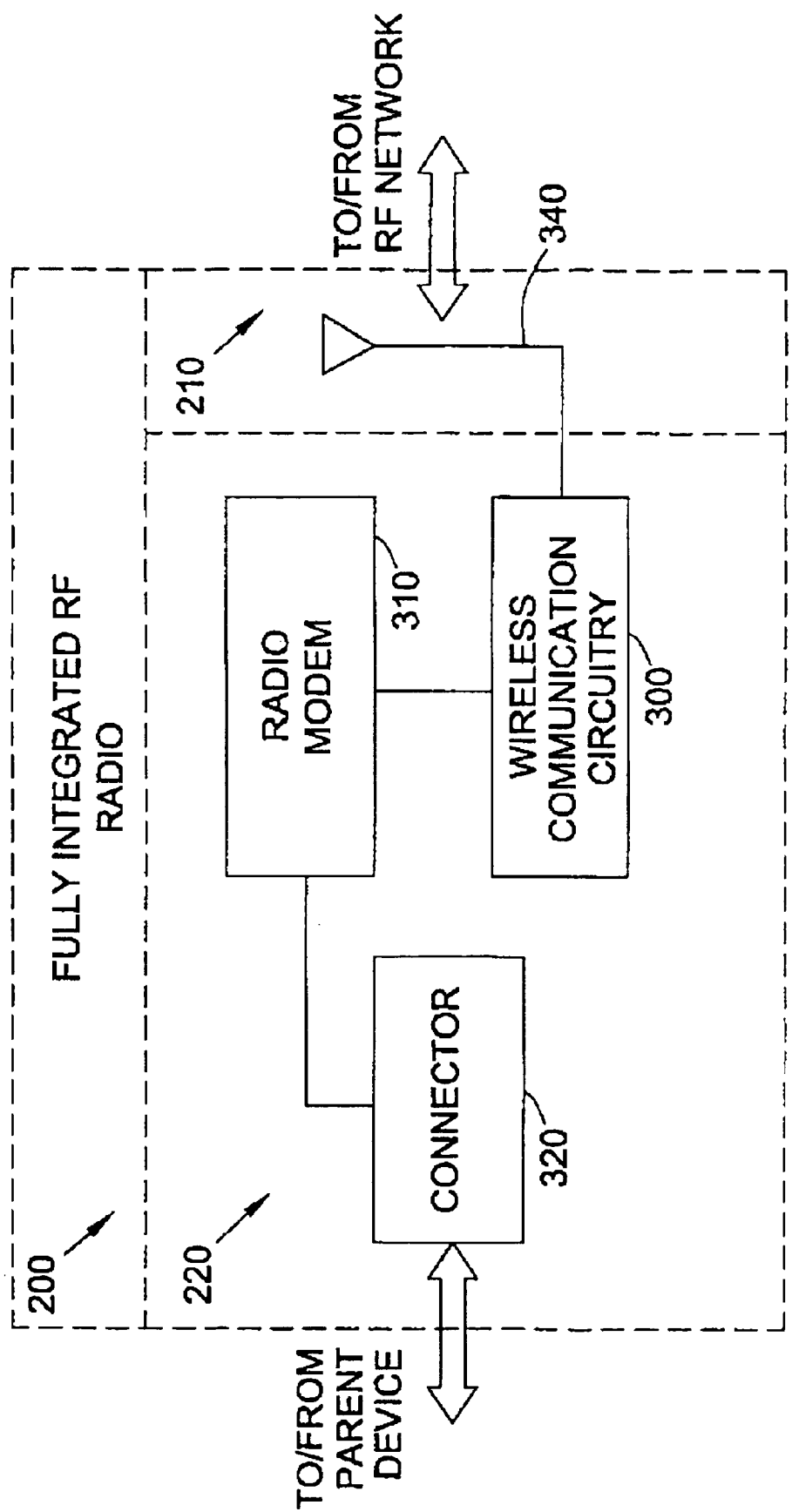
FIG. 3 shows a schematic of a preferred embodiment of a fully integrated RF transceiver radio.

A schematic representation of adapter 200 is shown in FIG. 3. The wireless transceiver module 220 includes wireless communication circuitry 300, radio modem 310, and an input/output connector 320. Wireless communication circuitry 300 typically includes a transmit path and a receive path. The transmit path may include filters, an intermediate frequency (IF) conversion stage, signal modulators, transmit amplifiers, impedance matching circuits to couple the transmit signal to the antenna, and other suitable circuitry to convert the baseband information signal into a modulated wireless signal. The receive path may include filters, receive amplifiers, downmixing circuitry, demodulators, adaptive gain control and other suitable circuitry to translate the receive wireless signal into a baseband receive signal. The modulation circuitry in the transmit path may include a channel encoder, an digital-to-analog converter, and mixer stage. The demodulation circuitry in the receive path may include an analog-to-digital converter, an equalizer, and a decoder.

Radio modem 310 includes bus interface circuitry, link protocol control circuitry, and baseband controller circuitry suitable for converting between a digital data stream and a baseband information signal. The link protocol circuitry and bus interface circuitry take digital data received from the connector 320 and provide it to the baseband controller for conversion to a raw baseband signal. The baseband controller also converts the received baseband signals from the wireless communication circuitry 300 into digital data that the link control circuitry and bus interface circuitry provide to the connector 320.

Input/output connector 320 allows for communication with the parent device (e.g., laptop, PDA) via a bus such as a universal serial bus (USB). A preferred embodiment of the input/output connector 320 is shown in FIG. 2b, which shows a reverse angle isometric view of the adapter 200 shown in FIG. 2a. In this particular embodiment, the connector 230 is a SIM (Subscriber Identity Module) style connector typically found in SIM cards used with mobile phones or smart card configurations. The input/output connector may alternatively take the form of electrical contacts 240 as shown in FIG. 2c or it may take the form of a pin/socket connector 250 as shown in FIG. 2d. The connector 250 may be a USB connector or may be of any other type suitable for circuit card assemblies. Other connector solutions are certainly possible and will be recognized by those skilled in the art. Note that these figures are schematic in nature; no specific pin count or definition should be inferred from these figures.

Referring again to FIG. 3, wireless transducer housing 210 includes the RF antenna 340 which transmits and receives signals to and from the applicable RF network. The antenna 340 may take the form of a microstrip, a ceramic design, a planar inverted F antenna (PIFA), or any of a number of low-profile, wireless RF antennas. It may be desirable to introduce a groundplane in the form of a circuit board to which the wireless circuitry is attached, a high-impedance electromagnetic lattice structure, or possibly even the exterior casing of the parent device. Examples of antenna materials and designs are described in K. Virga et al., Low-Profile Enhanced-Bandwidth PIFA Antennas for Wireless Communications Packaging, IEEE Transactions on Microwave Theory and Techniques, Vol. 45, No. 10, October 1997, at 1879 and D. Sievenpiper et al., High-Impedance Electromagnetic Surfaces with a Forbidden Frequency Band, IEEE Transactions on Microwave Theory and Techniques, Vol. 47, No. 11, November 1999, at 2059, which are hereby incorporated by reference.

A variety of antenna technologies may be implemented in the preferred embodiment. In addition to the antennas that may receive and transmit signals in accordance with the Bluetooth and IEEE 802.11 standards discussed above, the preferred embodiment may also be implemented with a dual-mode or multi-mode antenna that conforms to other RF standards. For example, the RF antenna 340 may transmit and receive per any of the standard cellular telephone standards or the General Packet Radio Service (GPRS) as used with the GSM digital cellular standard. GPRS refers to a packet transmission technology that will allow end users to remain constantly connected to a cellular network and receive and transmit data at speeds to over 100 Kbps. The RF antenna 340 may also be configured to transmit and receive per the 3G cellular standard, which is the next generation of mobile communication systems currently under development by the global 3G Partnership Project (3GPP). The 3G standard is based roughly on the GSM cellular standard but is expected to be extended and enhanced for high speed multimedia data services.

Additionally, the RF antenna 340 may alternatively incorporate diversity antenna technology. Antenna diversity generally involves the use of multiple antenna elements whose signals are sampled on a per packet basis so as to select the stronger signal. Multiple antenna elements may also be implemented to provide antenna redundancy or alternatively, the transmit and receive antenna elements may be separated to account for a noisy antenna design.

The components in the preferred embodiment of the invention may be encapsulated in or implemented on a variety of materials. The preferred composition is FR-4 printed circuit board material. Other circuit board materials such as polyimides, glass epoxy, and teflon are certainly feasible. Additionally, other plastics such as PVC and materials used in credit card and smart card manufacturing are also possible.

Another embodiment of the wireless link adapter 200 may incorporate the antenna into the exterior surface of the adapter or into the exterior casing of the parent device, thereby eliminating the need for a dedicated antenna and transducer housing 210. Thermoplastics impregnated with conductive material may be molded onto the exterior of the adapter 200. Alternatively, the conductive material which functions as the RF antenna may be electro-deposited or vapor deposited on the exterior surface of the adapter 200. In another embodiment, the antenna material may be deposited, molded, or otherwise applied in the shape of a company logo 260. The overall thickness of the adapter 200 is expected to be on the order of about 2 mm and the size to be roughly that of a credit card or smaller. The external configuration of the adapter 200 allows for easy standardization across product lines and device types. Furthermore, the adapter 200 can be installed during manufacture, at the point of sale, or by the customer as an upgrade option. In either case, the fully integrated wireless link adapter 200 is ready for use and is installed without the need for antenna assembly, alignment, or tuning.

Figure 4:
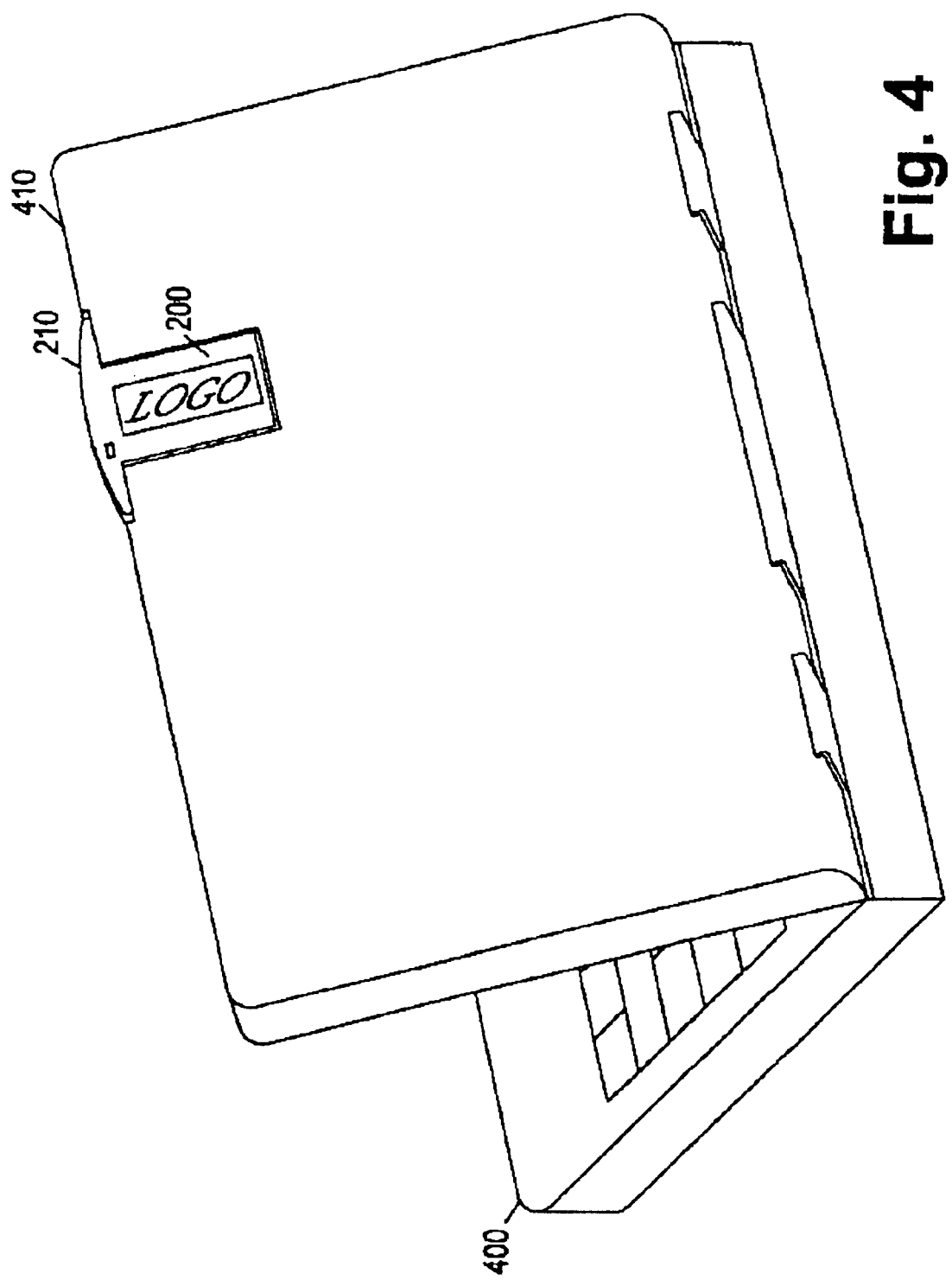
FIG. 4 shows an isometric view of the preferred embodiment of an RF transceiver radio installed in a notebook computer.

FIG. 4 shows a preferred embodiment of the wireless link adapter 200 installed in a portable computer 400. In a preferred embodiment, the transducer 210 is positioned near the upper edge 410 of the display area of the portable computer 400.

Figure 9:
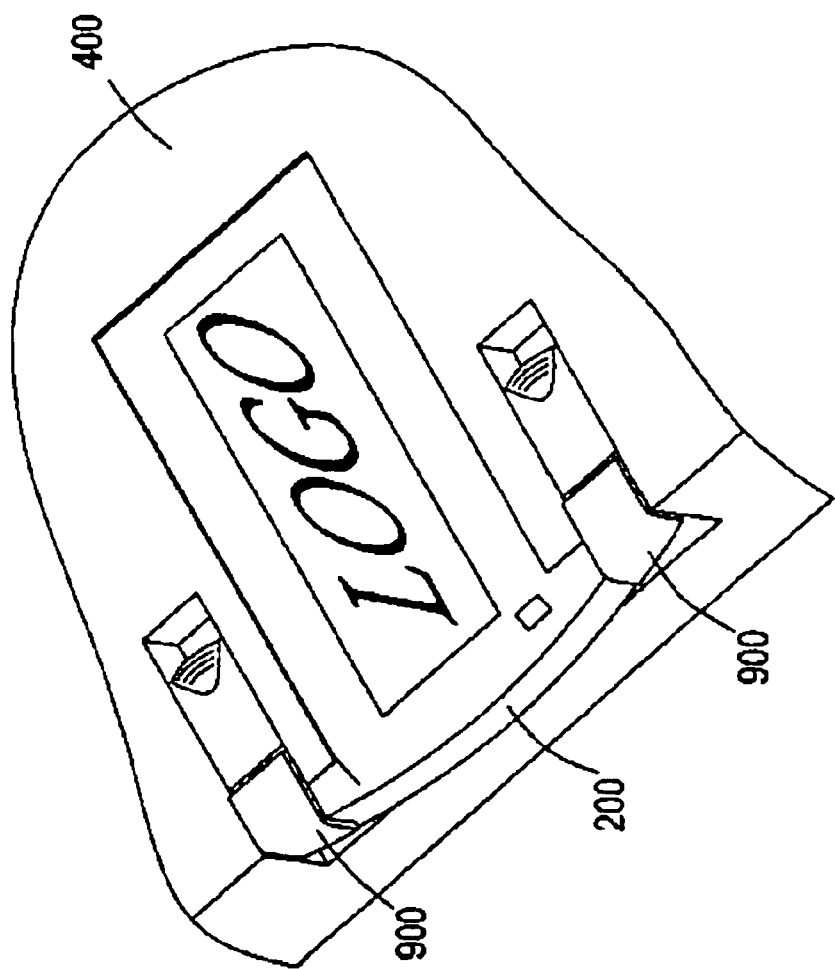
FIG. 9 shows a receptacle that secures the transceiver module with latches.

Installation of the preferred embodiment of the wireless link adapter 200 into a parent device such as a portable computer 400 is shown in FIG. 5*a*. During installation, the adapter 200 slides into a recess 510 in the computer 400. Once the radio in pushed or slid into place, the connector contacts 520 on the computer 400 will make contact with the connector contacts located on the adapter 200. The radio may be secured in place with screws 530 as shown. Alternative securing methods such as latches, detents, and quick-release mechanisms may also be used. One such alternative embodiment is shown in FIG. 9.

Referring now to FIG. 5*b*, in the event a user does not want or need the wireless link adapter 200 installed in the computer 400, a passive insert 540 may be installed to cover the recess 510 and protect the connector contacts 520. The passive insert may be identical in shape to the wireless link adapter 200 or may be slightly different in shape to accommodate manufacturing requirements and reduce cost.

Since the wireless link adapter 200 connects to the computer 400 via an expansion bus, the recess 510 in the portable computer 400 may alternatively be used for other expansion devices such as a camera or a biometric security device. Other devices are certainly applicable and will be recognized by those skilled in the art.

Figure 6B:
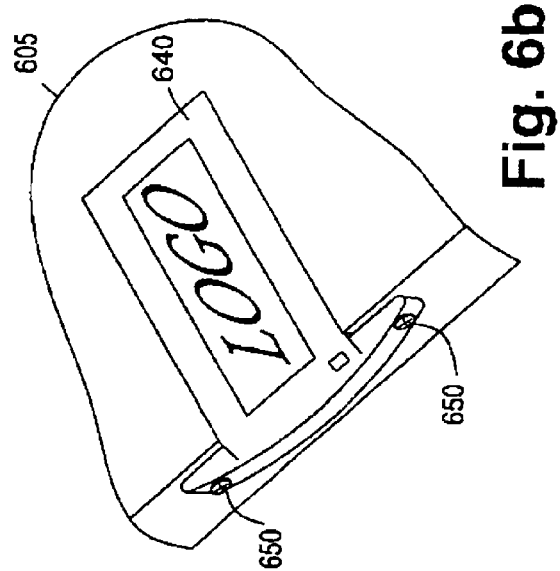
FIG. 6b shows an alternate embodiment of the installed RF transceiver module when installed.
Figure 6A:
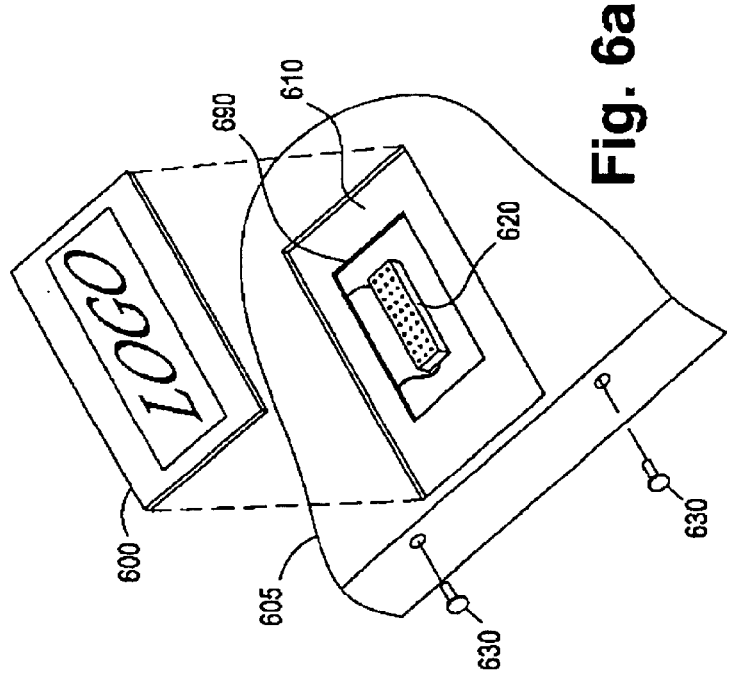
FIG. 6a shows an alternate embodiment of the receptacle for the RF transceiver module.

FIG. 6*a* represents another embodiment of the installation of a protective cover 600 onto a computer 605 that is not equipped with a wireless link adapter. In this embodiment, the cover 600 is snapped or pressed into a recess 610 in the case of the computer 605. Once installed, the protective cover 600 will conceal the expansion bus connector 620. The cover may also contain a company logo or other descriptive or decorative markings. Any exposed mounting holes may be covered or filled using screws or rubber or plastic plugs 630.

FIG. 6*b* represents an alternative embodiment where a wireless link adapter 640 is installed in computer 605 and is partially secured using screws 650. The full means by which this embodiment of the adapter 640 is installed and secured may be more clearly understood by referring to FIG. 6*c*.

Figure 6C:
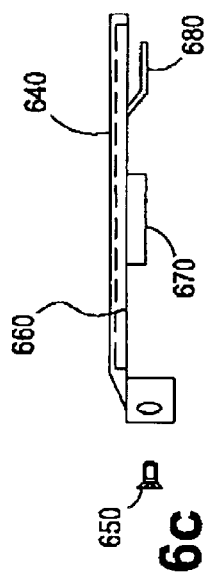
FIG. 6c shows a side view of the alternate RF transceiver module embodiment.

FIG. 6*c* shows a side view of the wireless link adapter 640. The wireless network circuitry is mounted in a recess 660 on the underside of the adapter 640. Also mounted within this recess 660 is the input/output connector 670. During installation, connector 670 is attached to connector 620 (FIG. 6*a*) to connect the adapter 640 to the expansion bus in computer 605. The adapter 640 is then installed into the recess 610 such that hold down clip 680 engages the edge 690 of the connector opening in the computer case. Screws 650 are then inserted through the adapter 640 and into the computer 605 to complete the installation.

FIG. 7 represents an alternative embodiment of the expansion port in a portable computer 700 into which a wireless link adapter may be installed. In this particular embodiment, a series of fingers or ledges 710 are molded into the upper display area of the computer 700. The ledges 710 are separated by gaps or spaces 720. The mating insert (whether it be a passive insert or wireless link adapter) will have its own set of fingers or protrusions that fit within these gaps 720. During installation of the adapter, the protrusions on the adapter are aligned with the gaps 720 in the computer case and the adapter is inserted in the direction of arrow 740. Once the adapter protrusions are below the ledges 710, the adapter is then slid in the direction of arrow 750. The adapter (or passive insert) may then be secured using screws inserted into the threaded holes 730 or some other suitable securing method. This embodiment may offer the advantage of providing a more secure retaining mechanism and also limits the distance that the adapter needs to be slid into and out of the expansion port.

FIG. 8 represents an alternative embodiment of the installation of a wireless link adapter 800 into a portable computer 810. In this particular embodiment, the adapter 800 is placed into a sleeve 820 which is permanently attached to the exterior of the computer 810. This embodiment allows an adapter 800 to be incorporated into existing notebook designs with minimal tooling changes.

FIG. 9 shows an alternative means of securing the wireless link adapter 200 to a portable computer 400. In this particular embodiment, latches 900 that hold the adapter 200 in place are incorporated into the case of the computer 400. It can be appreciated that this embodiment offers advantages over the use of screws or fasteners since the securing device is attached to the computer 400 and there is no hardware to be lost during installation or removal of the adapter 200. As mentioned previously, other means of securing the adapter 200 to the computer 400 are possible and the descriptions herein are not intended to limit the scope of the securing mechanism. For example, special hardware may be used to secure the adapter 200 to the computer 400. Such hardware may require proprietary or specialized tools for installation and removal of the adapter 200. Tamper resistant hardware of this type may advantageously deter thieves and provide a measure of security for the adapter 200 and computer 400.

Figure 10:
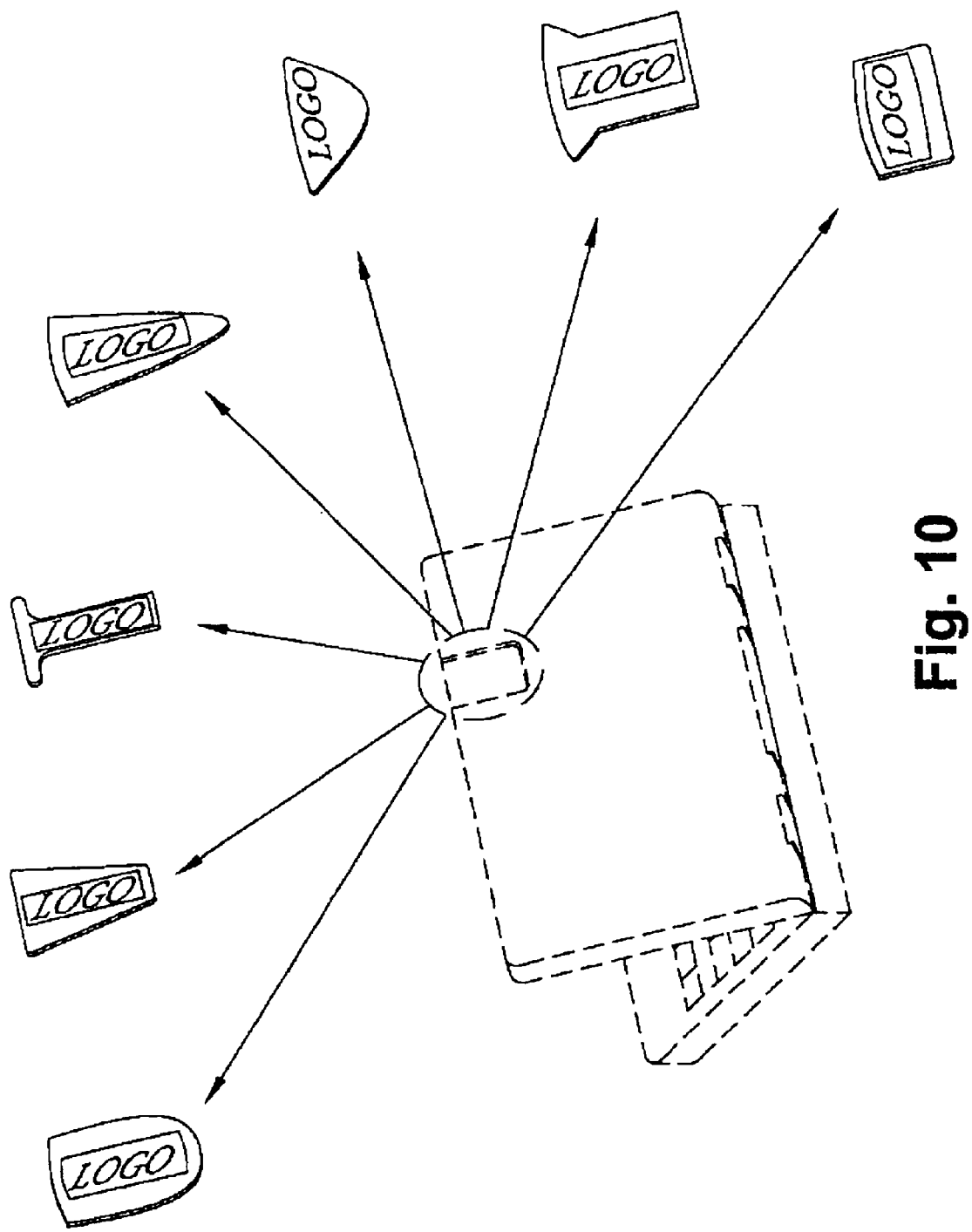
FIG. 10 shows a variety of molding element shapes that may be used to house the RF transceiver in an aesthetic fashion.

It is noted that wireless link adapter 200 may be advantageously packaged as a removable piece of decorative molding or trim. Packaged in this manner, the adapter adds to the aesthetic appeal of the electronic device while permitting easy removal and installation of the adapter. The molding element may take various forms such as those shown in FIG. 10.

Figure 11:
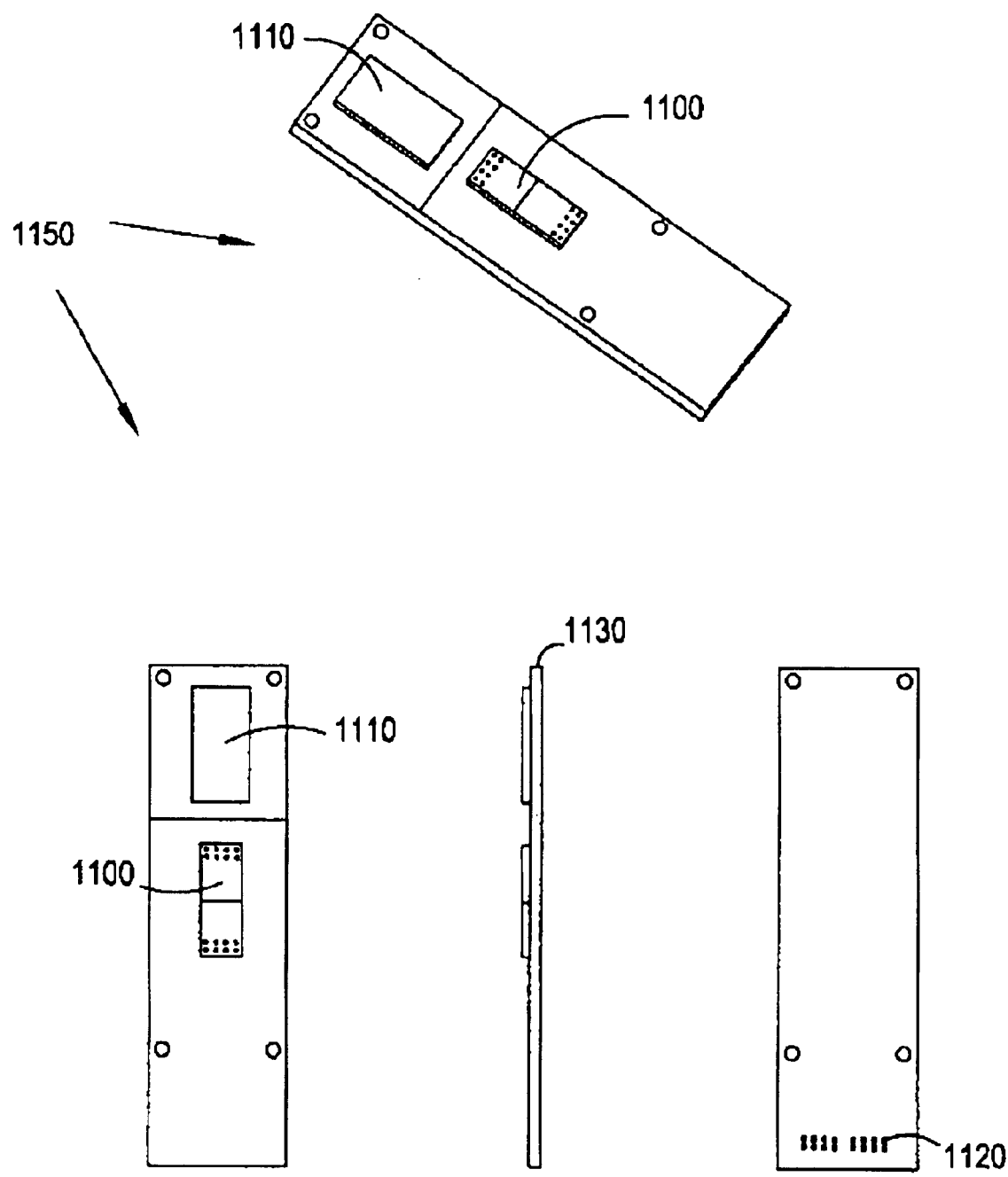
FIG. 11 shows an alternative embodiment of a fully integrated RF transceiver radio in the form of a circuit card assembly.

An alternative embodiment may preferably take the form of a conventional circuit card assembly 1150 as shown in FIG. 11. In this embodiment, the RF Radio circuitry and components shown in FIG. 3 are installed on a circuit board 1130. Included in this embodiment are an RF Radio Module 1100, the RF Antenna 1110, connector contacts 1120, and any other necessary circuitry as discussed above in the description of the RF Radio Adapter of FIG. 3.

Figure 12:
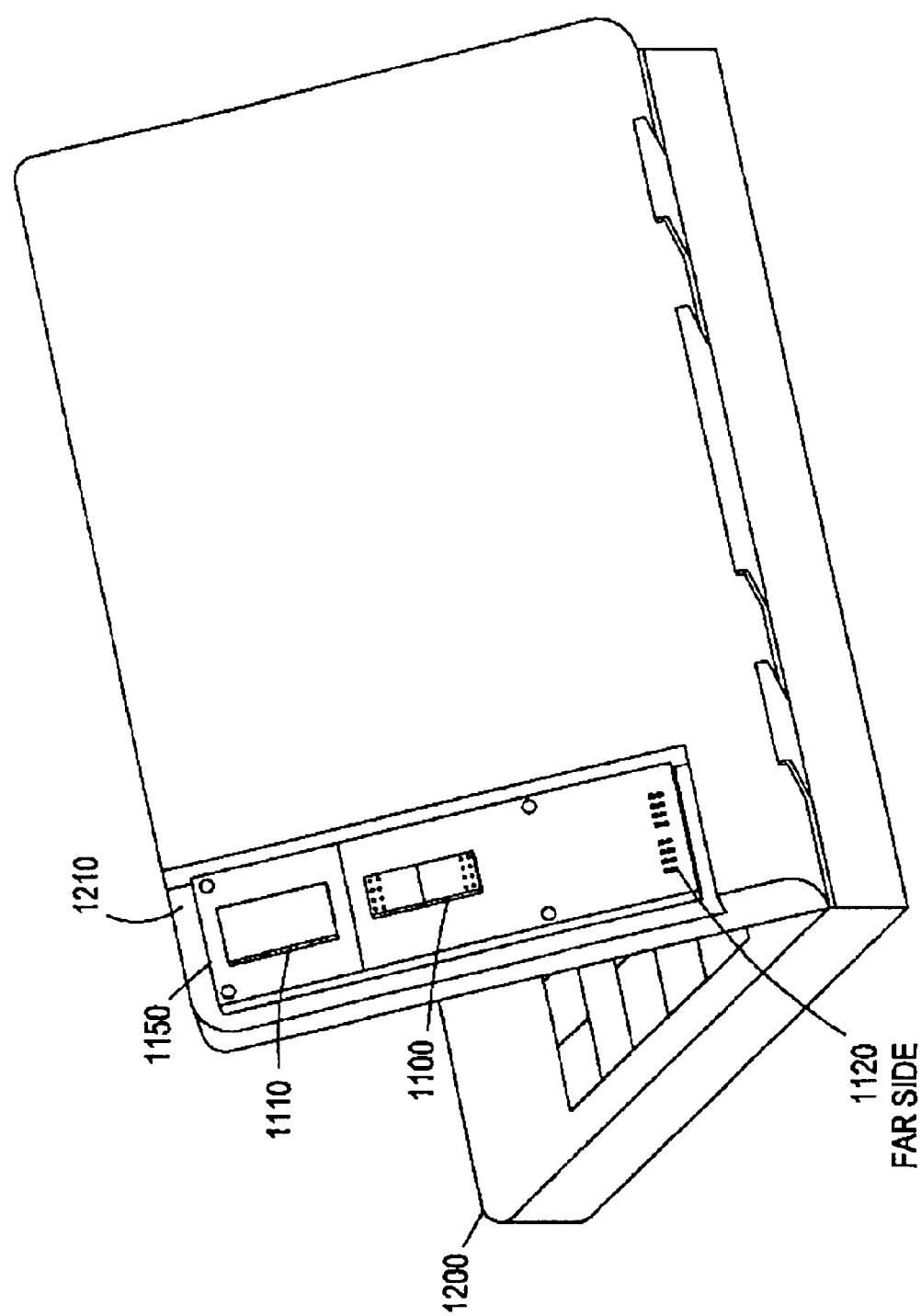
FIG. 12 shows the installation of the alternative embodiment of FIG. 11 installed in a portable computer.

This alternative embodiment may preferably be installed in a portable computer 1200 as shown in FIG. 12. Portable computer 1200 preferably has a recess 1210 in the exterior shell behind the display area of the computer in which the circuit card assembly 1150 is installed. The recess 1210 may be placed in the location shown in FIG. 12 or it may be placed in alternative locations as dictated by the size and shape of the circuit card assembly 1150. This recess should preferably be located such that the RF Antenna 1110 is located high on the display cover as discussed above. The recess 1210 in the portable computer preferably has mating contacts which connect to connector contacts 1120 thereby permitting transmission of signals between the RF Radio and the portable computer.

Figure 13:
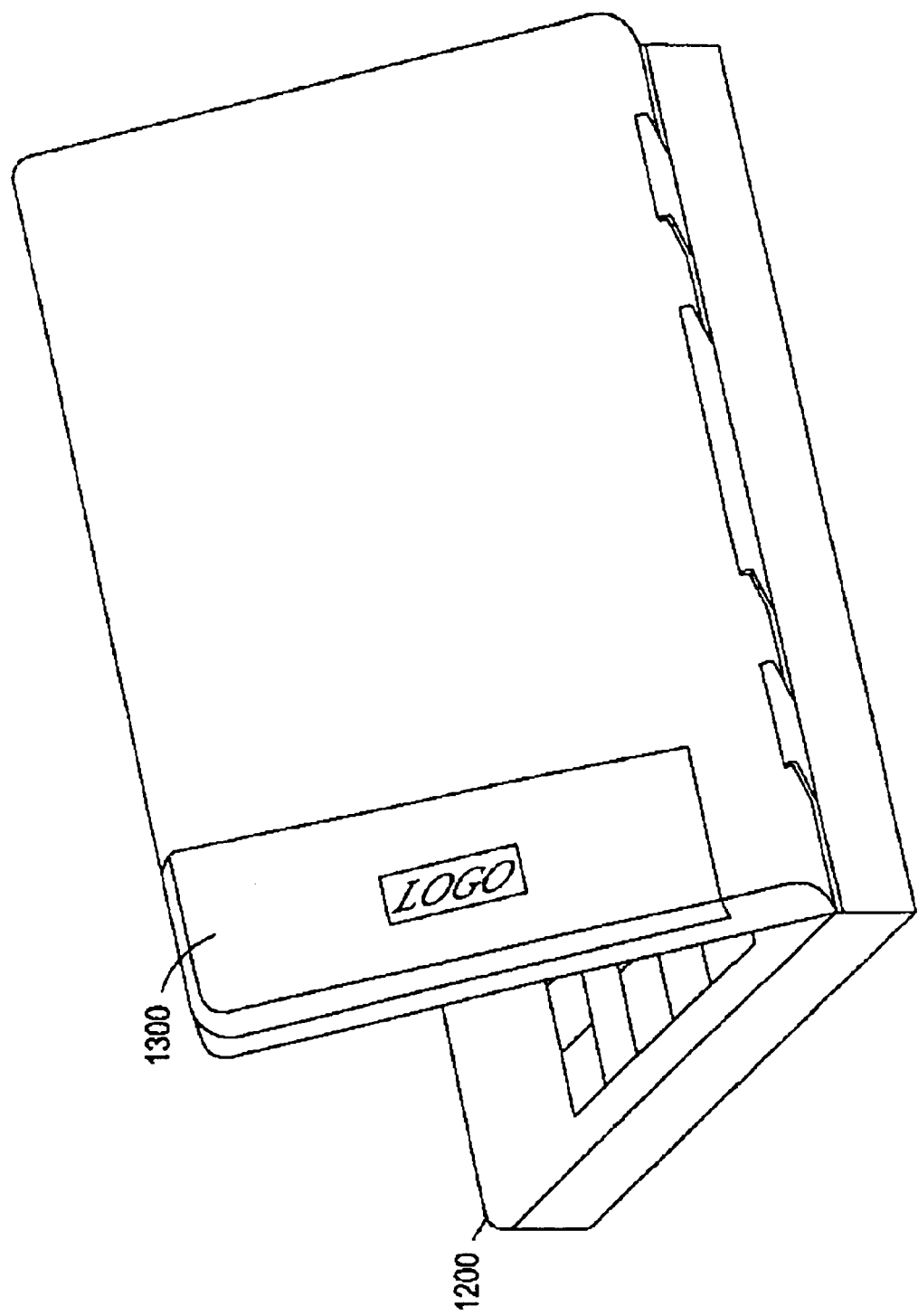
FIG. 13 shows a detachable molding element used to cover the alternative embodiment installed in a portable computer.

This alternative embodiment of the RF Radio may preferably be enclosed in a detachable molding element 1300 as shown in FIG. 13. This molding element 1300 preferably attaches to the exterior shell of the portable computer 1200. Additionally, the molding element 1300 preferably covers the circuit card assembly 1150 and the recess 1210 in the exterior shell of the portable computer 1200. This embodiment offers the advantage of using the same molding element 1300 to cover the recess 1210 regardless of whether the end user opts to purchase the optional RF Radio assembly.

The above discussion is meant to be illustrative of the principles and various embodiments of the present invention. Numerous variations and modifications will become apparent to those skilled in the art once the above disclosure is fully appreciated. For example, it is possible for the wireless link adapter to be fully incorporated into the latch mechanism of a portable computer. It is intended that the following claims be interpreted to embrace all such variations and modifications.

What is claimed is:

1. A removable wireless network adapter for use with a computer system, comprising:
   wireless communication circuitry;
   a bus connector for coupling the wireless communication circuitry to an expansion bus in the computer system;
   an RF antenna for communication with a wireless network;
   a radio modem that converts between digital and modulated analog signals;
   a housing for housing the wireless communication circuitry, radio modem and RF antenna; and
   the network adapter fits in a recess formed in an outer surface of the computer system and when fitted in the recess, the bus connector couples to the expansion bus and a portion of the exterior surface of the computer system functions as a ground plane for the RF antenna.

2. The wireless network adapter of claim 1, wherein the computer system comprises a laptop computer having a hinged display, and the network adapter fits in a recess formed in an outer surface of the display.

3. A removable wireless network adapter as defined in claim 1, wherein the RF antenna comprises conductive material that is deposited on the housing.

4. A removable wireless network adapter as defined in claim 3, wherein the conductive material is in the shape of a company logo.

5. A removable wireless network adapter as defined in claim 1, wherein the RF antenna is in a fixed location inside of the housing.

6. A wireless network adapter that mates with a computer system, comprising:
   wireless communication circuitry that fits within a recess in an outer surface of the computer system;
   a bus connector adapted to couple the wireless communication circuitry to an expansion bus in the computer system;
   an antenna for communication with a wireless network and adapted to fit within the recess; and
   a detachable cover that encases the communication circuitry and antenna and covers the recess.

7. The wireless network adopter of claim 6 wherein the computer system comprises a portable computer having a hinged display and the detachable cover covers a recess formed in the display.

8. A wireless network adapter that mates with a hinged lid of a laptop computer, comprising:
   wireless communication circuitry;
   an antenna coupled to the wireless communication circuitry;
   wherein the communication circuitry and antenna attach to the lid; and
   a detachable cover encases the communication circuitry and antenna and functions as a latch release for the lid of the laptop computer.

9. The wireless network adapter of claim 8 wherein the detachable cover fits in a recess formed in the lid and covers the recess.

10. A wireless network adapter as defined in claim 8, wherein the antenna comprises conductive material that is deposited on the detachable cover.

11. A wireless network adapter as defined in claim 10, wherein the conductive material is in the shape of a company logo.

12. A method for providing a wireless communication link for a computer that includes an exterior case having a recess, comprising;
   inserting a detachable molding element that houses a wireless network adapter that includes wireless communication circuitry and an RF antenna for communication with a wireless network into the recess; and automatically establishing an electrical interconnection between the wireless network adapter and the computer upon the detachable molding element being inserted into the recess.

13. A method as defined in claim 12, wherein the detachable molding element covers the recess once it is inserted into the recess.

14. A method as defined in claim 12, wherein the computer comprises a laptop computer having a lid and the detachable molding element functions us a latch release for the lid.

15. A method as defined in claim 12, further comprising:

securing the detachable molding element to the recess using one or more latches.

* * * * *

UNITED STATES PATENT AND TRADEMARK OFFICE
CERTIFICATE OF CORRECTION

PATENT NO. : 6,870,733 B2 Page 1 of 1
APPLICATION NO. : 10/735326
DATED : March 22, 2005
INVENTOR(S) : Robin T. Castell et al.

It is certified that error appears in the above-identified patent and that said Letters Patent is hereby corrected as shown below:

IN THE CLAIMS

Column 10, line 39, delete "adopter" and insert therefor --adapter--

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,870,733 B2 | Page 1 of 1 |
| APPLICATION NO. | : 10/735326 | |
| DATED | : March 22, 2005 | |
| INVENTOR(S) | : Robin T. Castell et al. | |

It is certified that error appears in the above-identified patent and that said Letters Patent is hereby corrected as shown below:

IN THE CLAIMS

Claim 14, Column 12, line 3, delete "us" and insert therefor --as--

Signed and Sealed this

Second Day of September, 2008

JON W. DUDAS
*Director of the United States Patent and Trademark Office*